US012603726B2

(12) United States Patent     (10) Patent No.:   US 12,603,726 B2

Atawia et al.            (45) Date of Patent:     Apr. 14, 2026

(54) ENHANCED FAST CRS RATE MATCHING SELECTION IN DSS

(71) Applicant: Telefonaktiebolaget LM Ericsson (publ), Stockholm (SE)

(72) Inventors: Ramy Atawia, Kanata (CA); Karl Mann, Ottawa (CA); Ravikiran Nory, San José, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 351 days.

(21) Appl. No.: 18/263,040

(22) PCT Filed: Jan. 28, 2022

(86) PCT No.: PCT/IB2022/050784

§ 371 (c)(1),
(2) Date: Jul. 26, 2023

(87) PCT Pub. No.: WO2022/162624

PCT Pub. Date: Aug. 4, 2022

(65) Prior Publication Data

US 2024/0080132 A1     Mar. 7, 2024

Related U.S. Application Data

(60) Provisional application No. 63/143,168, filed on Jan. 29, 2021.

(51) Int. Cl.
*H04L 12/26*        (2006.01)
*H04L 1/00*         (2006.01)
(Continued)

(52) U.S. Cl.
CPC ....... *H04L 1/0067* (2013.01); *H04W 72/1273* (2013.01); *H04W 72/231* (2023.01)

(58) Field of Classification Search
None
See application file for complete search history.

(56) References Cited

U.S. PATENT DOCUMENTS

| | | | |
|---|---|---|---|
| 2012/0275400 A1* | 11/2012 | Chen | H04J 11/0033 |
| | | | 370/329 |
| 2014/0064135 A1* | 3/2014 | Chen | H04B 7/024 |
| | | | 370/328 |

(Continued)

FOREIGN PATENT DOCUMENTS

WO     2018/203650 A1    11/2018

OTHER PUBLICATIONS

International Search Report and Written Opinion dated May 13, 2022 issued in PCT Application No. PCT/IB2022/050784 filed Jan. 28, 2022, consisting of 16 pages.

(Continued)

*Primary Examiner* — Zewdu A Beyen
(74) *Attorney, Agent, or Firm* — Weisberg I.P. Law, P.A.

(57) ABSTRACT

A network node configured to communicate with a wireless device (WD) utilizing at least one of a first Radio Access Technology (RAT) and a second RAT is provided. The network node includes processing circuitry configured to determine a rate matching configuration from a plurality of rate matching configurations for communication with the WD and cause the network node to transmit an indication of the determined rate matching configuration to the WD and to use the determined rate matching configuration in at least another transmission towards the WD.

16 Claims, 7 Drawing Sheets

(51) Int. Cl.
    _H04W 72/1273_     (2023.01)
    _H04W 72/231_     (2023.01)

(56) References Cited

U.S. PATENT DOCUMENTS

| | | | |
|---|---|---|---|
| 2019/0045490 A1 | 2/2019 | Davydov et al. | |
| 2019/0261327 A1 | 8/2019 | Hosseini et al. | |
| 2020/0154281 A1 | 5/2020 | Muruganathan et al. | |
| 2021/0266753 A1* | 8/2021 | Kumar | H04W 28/0252 |
| 2022/0086844 A1* | 3/2022 | Rassam | H04L 1/0069 |

OTHER PUBLICATIONS

3GPP TSG RAN WG1 Meeting #70; R1-123218; Title: Downlink Control Signaling for CoMP; Source: CATT; Agenda Item: 7.5.4; Document for: Discussion and Decision; Qingdao, China, Aug. 13-17, 2012, consisting of 3 pages.
3GPP TS 38.212 V16.0.0; 3rd Generation Partnership Project; Technical Specification Group Radio Access Network: NR; Multiplexing and channel coding (Release 16); Dec. 2019, consisting of 145 pages.
3GPP TS 38.306 V16.2.0; 3rd Generation Partnership Project; Technical Specification Group Radio Access Network; NR; User Equipment (UE) radio access capabilities (Release 16); Sep. 2020, consisting of 126 pages.
3GPP TS 38.214 V16.1.0; 3rd Generation Partnership Project; Technical Specification Group Radio Access Network; NR; Physical layer procedures for data (Release 16); Mar. 2020, consisting of 151 pages.
3GPP TS 38.213 V16.4.0; 3rd Generation Partnership Project; Technical Specification Group Radio Access Network; NR; Physical layer procedures for control (Release 16); Dec. 2020, consisting of 181 pages.
3GPP TS 38.211 V16.3.0; 3rd Generation Partnership Project; Technical Specification Group Radio Access Network; NR; Physical channels and modulation (Release 16); Sep. 2020, consisting of 133 pages.
3GPP TS 38.331 V16.3.0; 3rd Generation Partnership Project; Technical Specification Group Radio Access Network; NR; Radio Resource Control (RRC) protocol specification (Release 16); Dec. 2020, consisting of 932 pages.

* cited by examiner

10

24

26

12

16a

18a

Node Rate Matching Unit
28

14

WD Rate Matching Unit
30

20

16c

18c 22a   22b

18b

16b

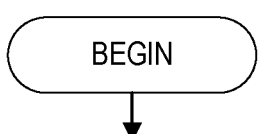

BEGIN

Determine a rate matching configuration from a plurality of rate matching configurations for communication with the WD S107

Transmit an indication of the determined rate matching configuration to the WD and use the determined rate matching configuration in at least another transmission towards the WD S108

END

FIG. 5

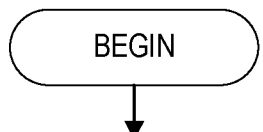

BEGIN

Receive an indication of a rate matching configuration for the WD to use to communicate with the network node S109

At least one of transmit to and receive from the network node a signal based at least on the indication of the rate matching configuration S110

END

FIG. 6

ENHANCED FAST CRS RATE MATCHING SELECTION IN DSS

CROSS-REFERENCE TO RELATED APPLICATIONS

This application is a Submission Under 35 U.S.C. § 371 for U.S. National Stage Patent Application of International Application No.: PCT/IB2022/050784, filed Jan. 28, 2022 entitled "ENHANCED FAST CRS RATE MATCHING SELECTION IN DSS," which claims priority to U.S. Provisional Application No. 63/143,168, filed Jan. 29, 2021, entitled "ENHANCED FAST CRS RATE MATCHING SELECTION IN DSS," the entireties of both of which are incorporated herein by reference.

TECHNICAL FIELD

The present disclosure relates to wireless communications, and in particular, to Common Reference Signal (CRS) rate matching selection in Dynamic Spectrum Sharing (DSS).

BACKGROUND

Communication networks, such as those provided based on standards promulgated by the 3rd Generation Partnership Project (3GPP), e.g., Long Term Evolution (LTE) and New Radio (NR) (NR is also referred to as 5G), generally benefit from DSS. More specifically, in cases where DSS is utilized, both LTE and NR signals can be allocated in the same subframe. The NR signal allocation is allowed in the resource elements that are not occupied by LTE signals.

According to a recent 3GPP release, a NR wireless device (WD) is informed about an LTE CRS rate matching pattern which enables NR Physical Downlink Shared Channel (PDSCH) transmission in the same Physical Resource Block (PRB) as the LTE CRS.

Standards based on 3GPP release 16 allow up to 3 CRS rate matching patterns that are flagged to an NR WD by means of Radio Resource Control (RRC) reconfiguration messages. As an example, a rate matching pattern indicates the following parameters: (1) number of CRS ports; (2) center frequency; (3) bandwidth; and (4) Multicast Broadcast Single Frequency Networks (MBSFNs) configuration. The NR WD applies rate matching around LTE CRS Resource Elements (REs) in all subframes except those that are configured as MBSFNs.

However, 3GPP releases only support RRC based reconfiguration of CRS rate matching patterns, which typically take a long time to be transmitted by a network node, e.g., gNB, and to be applied by the WD, possibly missing such opportunity during brief transmissions.

SUMMARY

Some embodiments advantageously provide methods and apparatuses for enhanced fast CRS rate matching selection in DSS. In order to achieve higher DSS gains, a change to the MBSFN configuration (e.g., to lower overhead) and/or a rate match around a neighbor's CRS (e.g., to reduce impact of interference) is provided. Being able to apply fast switching and/or reconfiguration between differently configured CRS rate matching patterns to adjust for changing situations may be advantageous to achieve certain performance gains.

According to one aspect of the present disclosure, a network node is described. The network node is configured to communicate with a WD utilizing at least one of a first Radio Access Technology (RAT) and a second RAT. The network node includes processing circuitry configured to determine a rate matching configuration from a plurality of rate matching configurations for communication with the WD; and cause the network node to transmit an indication of the determined rate matching configuration to the WD and to use the determined rate matching configuration in at least another transmission towards the WD.

In some embodiments, the processing circuitry is further configured to: determine that the WD supports rate matching, including a Downlink Control Information (DCI) based Common Reference Signal (CRS) rate matching; generate the plurality of rate matching configurations, each of the plurality of rate matching configurations being selectable based at least on a DCI field, the DCI field indicating at least one of a semi-static rate matching configuration and a CRS rate matching configuration; and cause the network node to transmit to the WD the plurality of rate matching configurations.

In some other embodiments, the indication of the determined rate matching configuration is one of DCI and a MAC layer command.

In one embodiment, the processing circuitry is further configured to cause the network node to transmit at least one of a first message and a second message in a predetermined time slot. The second message indicates a value that causes the WD to at least one of: determine whether a set of resource elements are available for a Physical Downlink Shared Channel (PDSCH) in a first set of time slots; and determine whether another set of resource elements indicated by a first rate matching configuration and indicated by a second rate matching configuration of the plurality of rate matching configurations are available for the PDSCH in the first set of time slots, the first set of time slots being indicated at least by one of the second message and another message different from the second message, the second message including the indication.

In some embodiments, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD 22 in response to the command detected in the PDCCH DCI format; and determined by the WD 22 by a predetermined bitfield provided in the second message.

In some other embodiments, determining the rate matching configuration from the plurality of rate matching configurations for communication with the WD further includes: measuring a load associated with at least one of the first RAT and the second RAT; determining a resource for each one of the first RAT and the second RAT; and selecting the rate matching configuration, the rate matching configuration being the CRS rate matching configuration.

In one embodiment, selecting the rate matching includes, when physical resources are allocated for the first RAT: muting a Long Term Evolution (LTE) CRS and indicating in DCI that CRS rate matching may be omitted; and determining a number of subframes corresponding to the muted LTE CRS; reconfiguring one rate matching configuration from the plurality of rate matching configurations based on the number of subframes; and causing the network node to transmit the reconfigured one rate matching configuration to the WD and other WDs.

In some embodiments, determining the rate matching configuration from the plurality of rate matching configurations for communication with the WD is based at least in part on a neighbor interference.

In some other embodiments, determining the rate matching configuration from the plurality of rate matching configurations for communication with the WD includes: determining a radio channel condition associated with one of the first RAT and the second RAT; measuring a load of neighboring cells associated with one of the first RAT and the second RAT; identifying an interfered rate matching configuration based on the radio channel condition and the load of neighboring cells; and including at least one neighboring rate matching pattern in the plurality of rate matching configurations, the at least one neighboring rate matching pattern excluding at least one resource element associated with the interfered rate matching configuration.

In one embodiment, the processing circuitry is further configured to evaluate and learn the rate matching configuration based at least on Key Performance Indicators (KPIs), a muted CRS on LTE, and adjustments associated with wireless devices operating on New Radio, NR.

According to another aspect, a method implemented in a network node is described. The network node is configured to communicate with a WD utilizing at least one of a first RAT, and a second RAT. The method includes determining a rate matching configuration from a plurality of rate matching configurations for communication with the WD; and transmitting an indication of the determined rate matching configuration to the WD and using the determined rate matching configuration in at least another transmission towards the WD.

In some embodiments, method further includes: determining that the WD supports rate matching, including a Downlink Control Information (DCI) based Common Reference Signal (CRS) rate matching; and generating the plurality of rate matching configurations, each of the plurality of rate matching configurations being selectable based at least on a DCI field, the DCI field indicating at least one of a semi-static rate matching configuration and a CRS rate matching configuration; and transmitting to the WD the plurality of rate matching configurations.

In some other embodiments, the indication of the determined rate matching configuration is one of DCI and a MAC layer command.

In one embodiment, method further includes: transmitting at least one of a first message and a second message in a predetermined time slot, the second message indicating a value that causes the WD to at least one of: determine whether a set of resource elements are available for a Physical Downlink Shared Channel (PDSCH) in a first set of time slots; and determine whether another set of resource elements indicated by a first rate matching configuration and indicated by a second rate matching configuration of the plurality of rate matching configurations are available for the PDSCH in the first set of time slots, the first set of time slots being indicated at least by one of the second message and another message different from the second message, the second message including the indication.

In another embodiment, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD in response to the command detected in the PDCCH DCI format; and determined by the WD by a predetermined bitfield provided in the second message.

In some embodiments, determining the rate matching configuration from the plurality of rate matching configurations for communication with the WD further includes: measuring a load associated with at least one of the first RAT and the second RAT; determining a resource for each one of the first RAT and the second RAT; and selecting the rate matching configuration, the rate matching configuration being the CRS rate matching configuration.

In some other embodiments, selecting the rate matching includes, when physical resources are allocated for the first RAT: muting a Long Term Evolution (LTE) CRS and indicating in DCI that CRS rate matching may be omitted; and determining a number of subframes corresponding to the muted LTE CRS; reconfiguring one rate matching configuration from the plurality of rate matching configurations based on the number of subframes; and transmitting the reconfigured one rate matching configuration to the WD and other WDs.

In one embodiment, determining the rate matching configuration from the plurality of rate matching configurations for communication with the WD is based at least in part on a neighbor interference.

In some embodiments, determining the rate matching configuration from the plurality of rate matching configurations for communication with the WD includes: determining a radio channel condition associated with one of the first RAT and the second RAT; measuring a load of neighboring cells associated with one of the first RAT and the second RAT; identifying an interfered rate matching configuration based on the radio channel condition and the load of neighboring cells; and including at least one neighboring rate matching pattern in the plurality of rate matching configurations, the at least one neighboring rate matching pattern excluding at least one resource element associated with the interfered rate matching.

In some other embodiments, the method further includes evaluating and learning the rate matching configuration based at least on Key Performance Indicators (KPIs), a muted CRS on LTE, and adjustments associated with wireless devices operating on New Radio (NR).

According to one aspect, a wireless device (WD) is described. The WD is configured to communicate with a network node utilizing at least one of a first RAT and a second RAT. The WD includes a processing circuitry configured to: cause the WD to receive an indication of a rate matching configuration for the WD to use to communicate with the network node; and cause the WD to at least one of transmit to and receive from the network node a signal based at least on the indication of the rate matching configuration.

In some embodiments, the processing circuitry is further configured to cause the WD to transmit a message indicating that the WD supports rate matching, including a Downlink Control Information (DCI) based Common Reference Signal (CRS) rate matching.

In some other embodiments, the processing circuitry is further configured to cause the WD to receive a plurality of rate matching configurations, each of the plurality of rate matching configurations being selectable based at least on a DCI field, the DCI field indicating at least one of a semi-static rate matching configuration and a CRS rate matching configuration.

In one embodiment, the indication of the rate matching configuration is one of DCI and a MAC layer command.

In another embodiment, the processing circuitry is further configured to cause the WD to receive at least one of a first message and a second message in a predetermined time slot. The second message indicates a value that causes the WD to at least one of: determine whether a set of resource elements are available for a Physical Downlink Shared Channel (PDSCH) in a first set of time slots; and determine whether another set of resource elements indicated by a first rate matching configuration and indicated by a second rate matching configuration of the plurality of rate matching configurations are available for the PDSCH in the first set of time slots.

In some embodiments, the first set of time slots is indicated at least by one of the second message and another message different from the second message, the second message including the indication.

In some other embodiments, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD 22 in response to the command detected in the PDCCH DCI format; and determined by the WD 22 by a predetermined bitfield provided in the second message. In one embodiment, the predetermined bitfield includes at least a CRS rate matching duration.

In another embodiment, the rate matching configuration is based on at least one of: a radio channel condition associated with one of the first RAT and the second RAT; and a load of neighboring cells associated with one of the first RAT and the second RAT.

In some embodiments, receiving the indication of the rate matching configuration causes the WD to select from at least one of the received plurality of rate matching configurations for the WD to communicate with the network node.

According to another aspect, a method implemented in a wireless device (WD) is described. The WD is configured to communicate with a network node utilizing at least one of a first Radio Access Technology (RAT) and a second RAT. The method comprising: receiving an indication of a rate matching configuration for the WD to use to communicate with the network node; and at least one of transmitting to and receiving from the network node a signal based at least on the indication of the rate matching configuration.

In some embodiments, the method further includes transmitting a message indicating that the WD supports rate matching, including a Downlink Control Information (DCI) based Common Reference Signal (CRS) rate matching.

In some other embodiments, the method further includes receiving a plurality of rate matching configurations, each of the plurality of rate matching configurations being selectable based at least on a DCI field, the DCI field indicating at least one of a semi-static rate matching configuration and a CRS rate matching configuration.

In one embodiment, the indication of the rate matching configuration is one of DCI and a MAC layer command.

In another embodiment, the method further includes receiving at least one of a first message and a second message in a predetermined time slot. The second message indicates a value that causes the WD to at least one of: determine whether a set of resource elements are available for a Physical Downlink Shared Channel (PDSCH) in a first set of time slots; and determine whether another set of resource elements indicated by a first rate matching configuration and indicated by a second rate matching configuration of the plurality of rate matching configurations are available for the PDSCH in the first set of time slots.

In some embodiments, the first set of time slots is indicated at least by one of the second message and another message different from the second message, the second message including the indication.

In some other embodiments, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD 22 in response to the command detected in the PDCCH DCI format; and determined by the WD 22 by a predetermined bitfield provided in the second message.

In one embodiment, the predetermined bitfield includes at least a CRS rate matching duration.

In another embodiment, the rate matching configuration is based on at least one of: a radio channel condition associated with one of the first RAT and the second RAT; and a load of neighboring cells associated with one of the first RAT and the second RAT.

In one embodiment, receiving the indication of the rate matching configuration causes the WD to select from at least one of the received plurality of rate matching configurations for the WD to communicate with the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart of another example method implemented in a network node according to one embodiment of the present disclosure;

FIG. 6 is a flowchart of another example method implemented in a WD according to one embodiment of the present disclosure;

DETAILED DESCRIPTION

Figure 1:
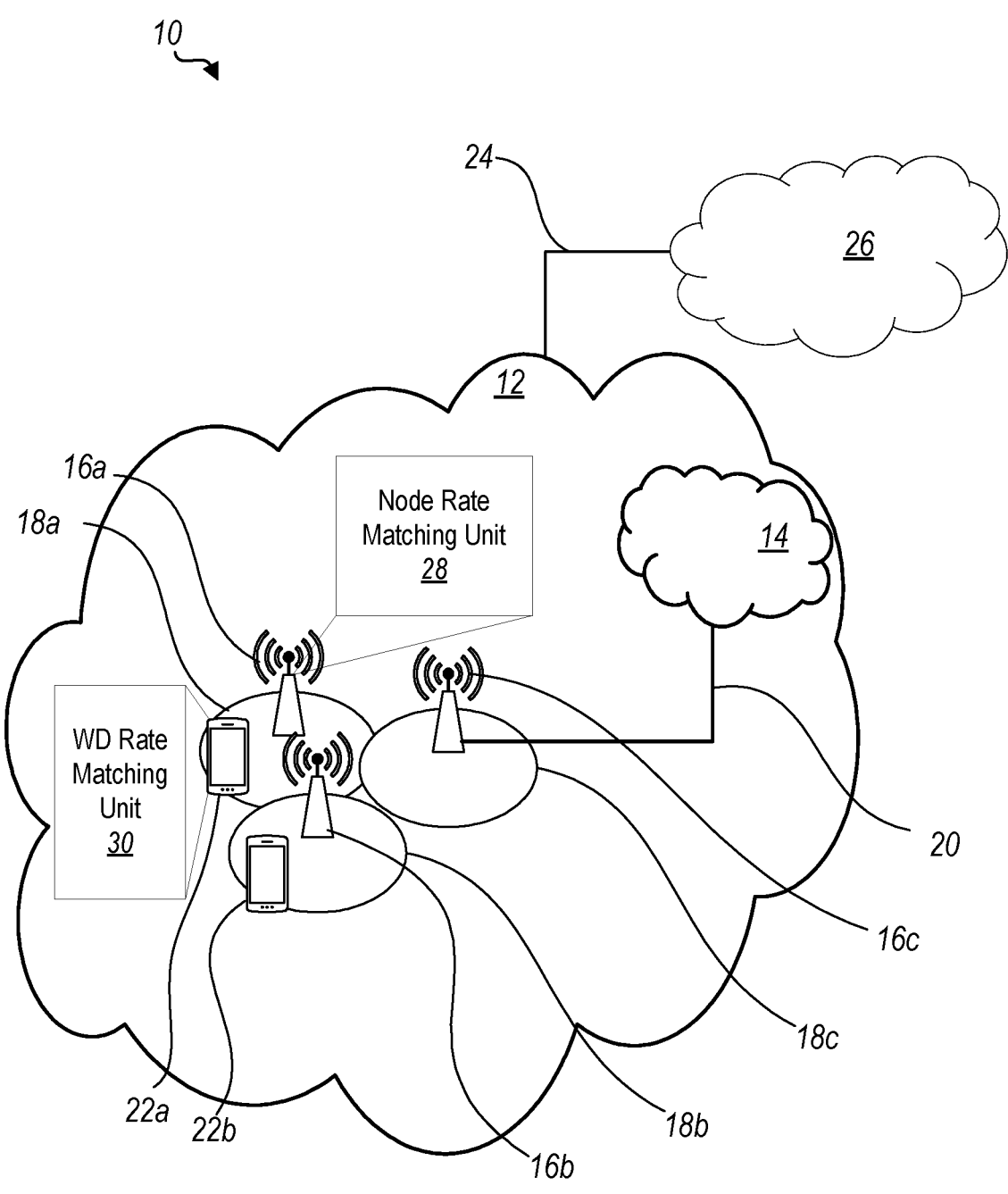
FIG. 1 is a schematic diagram of an example network architecture illustrating a communication system according to the principles in the present disclosure.

Some embodiments of the present disclosure allow for CRS Rate Matching Selection in DSS. DSS allows network nodes and WDs to operate using multiple Radio Access Technologies. Some nonlimiting examples of RATs include LTE and NR. However, RATs as described in the present disclosure are not limited to LTE and NR and may include other radio access technologies. According to an embodiment, a fast indication to the WD is enabled, e.g., at the Transmission Time Interval (TTI)-level, which indicates at least a CRS rate matching pattern to be applied. In a non-limiting example, the following may be included (1) switching between multiple CRS rate matching patterns; (2) disabling all configured patterns, e.g., similar to cases where an information element (IE) is not sent to a WD; and/or (3) applying a CRS rate matching pattern jointly with other NR semi-static rate matching patterns.

In some other embodiments, the fast indication may be, for instance, based on a field in Downlink Control Information (DCI) and/or a Medium Access Control (MAC) Control Element (CE) command. In an embodiment, a framework is provided to select which CRS pattern to be indicated to the WD on each slot based at least on LTE traffic load, radio conditions, operator-based configuration, and WD capabilities.

In another embodiment, robust transmissions of NR signals are provided to the WD by applying rate matching around neighboring CRS s, e.g., for NR cell edge users. In some embodiments, efficiency of the DSS carrier is rapidly controlled by muting LTE CRS and selecting a corresponding rate matching configuration, e.g., with larger number of MBSFNs, by disabling rate matching.

In some embodiments, a process is provided for fast signaling of rate matching patterns to WDs operating on NR in dynamic spectrum sharing deployment (e.g., LTE and NR). WD capability messages are adopted to identify WDs that support rate matching. In some other embodiments, implementations are provided for a network node, such as via a network controller, that determines a rate matching configuration at each slot based on channel conditions, load and WD capabilities.

Before describing in detail exemplary embodiments, it is noted that the embodiments reside primarily in combinations of apparatus components and processing steps related to physical distancing tracking and notification. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

In some embodiments, the term "WD" may be a vehicle with integrated wireless device functionality/hardware, a vehicle engaged in V2X communication/services, a wireless device inside a vehicle, the wireless device of a VRU, a wireless device supporting communication via D2D, a WD and the like.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for CRS rate matching selection in DSS. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. Any one of network node 16 may be a network controller. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. In addition, it is contemplated that a network node 16 can be in simultaneous communication and/or configured to separately communicate with more than one WD 22 and more than one type of WD 22. For example, a network node 16 can have connectivity with a WD 22 that supports LTE (or first RAT) and also have connectivity with another WD 22 that supports NR (or a second RAT). It may further be contemplated that a network node 16 can have connectivity with a WD 22 that supports LTE and NR, or any combination of RATs.

A network node 16 includes a node rate matching unit 28 which is configured to determine a rate matching configuration from a plurality of rate matching configurations for communication with the WD 22, e.g., configured for enhanced fast CRS rate matching selection on the network node 16 in DSS.

WD 22 includes a WD rate matching unit 30 which is configured to receive an indication of a rate matching configuration for the WD 22 to communicate with the network node 16 based at least on the rate matching configuration, e.g., configured for enhanced fast CRS rate matching selection on the WD 22 in DSS.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 38 with the WD 22 located in a coverage area 18 served by the network node 16. The radio interface 36 may be formed as or may include, for example, one or more RF transmitters, one or more RF receivers, and/or one or more RF transceivers, as well as one or more antennas.

In the embodiment shown, the hardware 32 of the network node 16 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 48 stored internally in, for example, memory 46, or stored in external memory (e.g., database, storage array, network storage device, etc.) accessible by the network node 16 via an external connection. The software 48 may be executable by the processing circuitry 42. The processing circuitry 42 may be configured to control any of the methods and/or processes described herein and/or to cause such methods, and/or processes to be performed, e.g., by network node 16. Processor 44 corresponds to one or more processors 44 for performing network node 16 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to network node 16. For example, processing circuitry 42 of the network node 16 may include node rate matching unit 28 configured to perform network node methods discussed herein, such as the methods discussed with reference to FIGS. 3 and 4 as well as other figures.

The communication system 10 further includes the WD 22 already referred to. The WD 22 may have hardware 50 that may include a radio interface 52 configured to set up and maintain a wireless connection 38 with a network node 16 serving a coverage area 18 in which the WD 22 is currently located. The radio interface 52 may be formed as or may include, for example, one or more RF transmitters, one or more RF receivers, and/or one or more RF transceivers. In some embodiments, the radio interface 52 may be a cellular interface (Uu) and may be configured to support Uu communication. The hardware 50 may also include a communication interface 54 configured to set up and maintain a wireless connection 56 with other WDs 22, such as WD 22*b*. The communication interface 54 may be formed as or may include, for example, one or more RF transmitters, one or more RF receivers, and/or one or more RF transceivers and may use the same RF components as the radio interface 52. The radio interface 52 and the communication interface 54 may, both or individually, form a communication interface of WD 22. In other words, "communication interface" as used herein refers to one or the other or both of the radio interface 52 and the communication interface 54.

The hardware 50 of the WD 22 further includes processing circuitry 58. The processing circuitry 58 may include a processor 60 and memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 64, which is stored in, for example, memory 62 at the WD 22, or stored in external memory (e.g., database, storage array, network storage device, etc.) accessible by the WD 22. The software 64 may be executable by the processing circuitry 58. The software 64 may include a client application 66. The client application 66 may be operable to provide a service to a human or non-human user via the WD 22. The client application 66 may interact with the user to generate the user data that it provides.

The processing circuitry 58 may be configured to control any of the methods and/or processes described herein and/or to cause such methods, and/or processes to be performed, e.g., by WD 22. The processor 60 corresponds to one or more processors 60 for performing WD 22 functions described herein. The WD 22 includes memory 62 that is configured to store data, programmatic software code and/or other information described herein. In some embodiments, the software 64 and/or the client application 66 may include instructions that, when executed by the processor 60 and/or processing circuitry 58, causes the processor 60 and/or processing circuitry 58 to perform the processes described herein with respect to WD 22. For example, the processing circuitry 58 of the WD 22 may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22 using one or more of the techniques disclosed herein.

Figure 2:
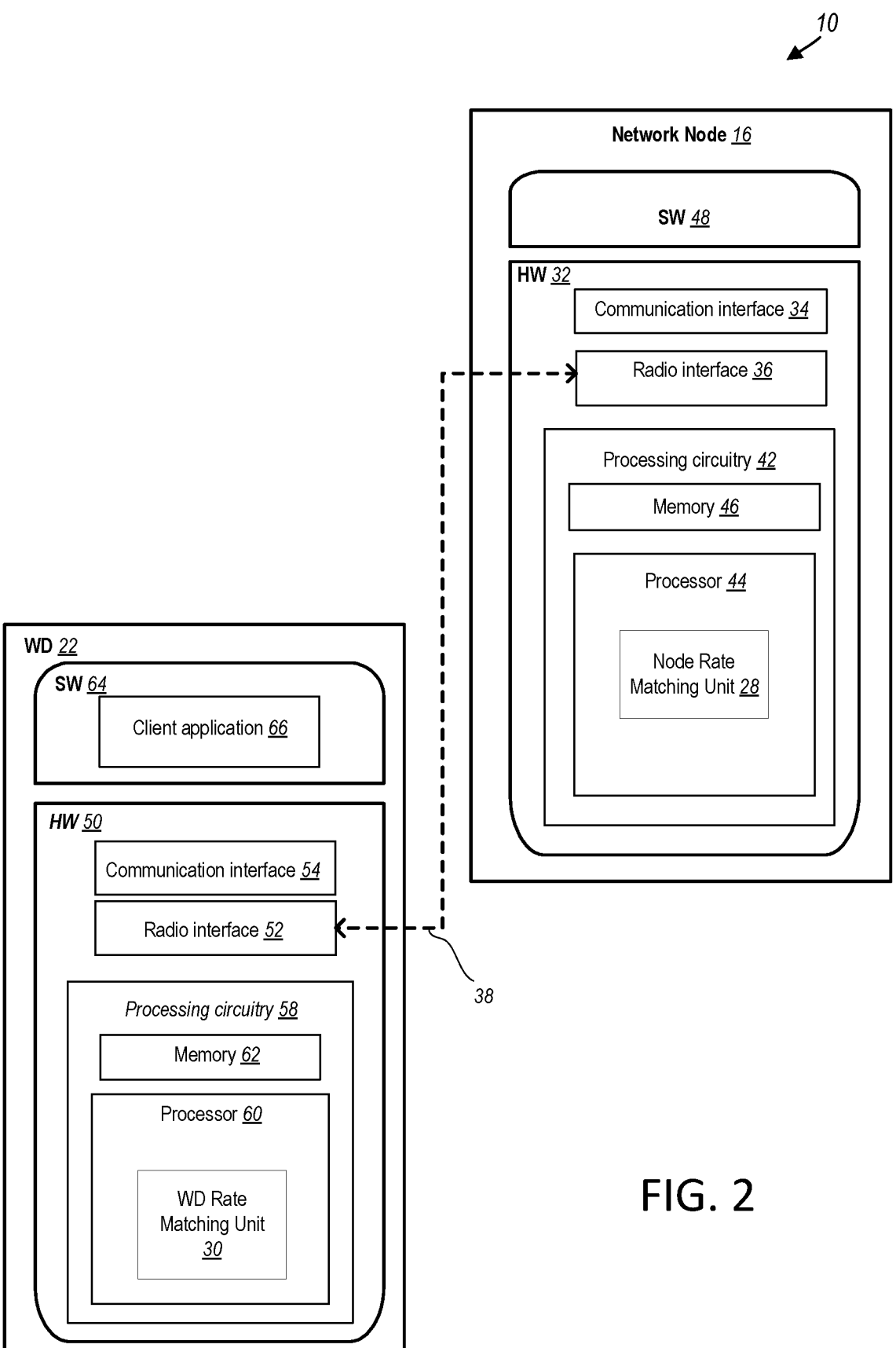
FIG. 2 is a block diagram of a network node supporting communication with wireless devices over an at least partially wireless connection and wireless devices supporting communication with the network node according to some embodiments of the present disclosure.

In some embodiments, the inner workings of the network node 16 and WD 22 may be as shown in FIG. 2, and independently, the surrounding network topology may be that of FIG. 1.

Although FIGS. 1 and 2 show various "units" such as node rate matching unit 28 and WD rate matching unit 30 as being within a processor, it is contemplated that these units may be implemented such that a portion of the unit is stored in a corresponding memory within the processing circuitry. In other words, the units may be implemented in hardware or in a combination of hardware and software within the processing circuitry.

Figure 3:
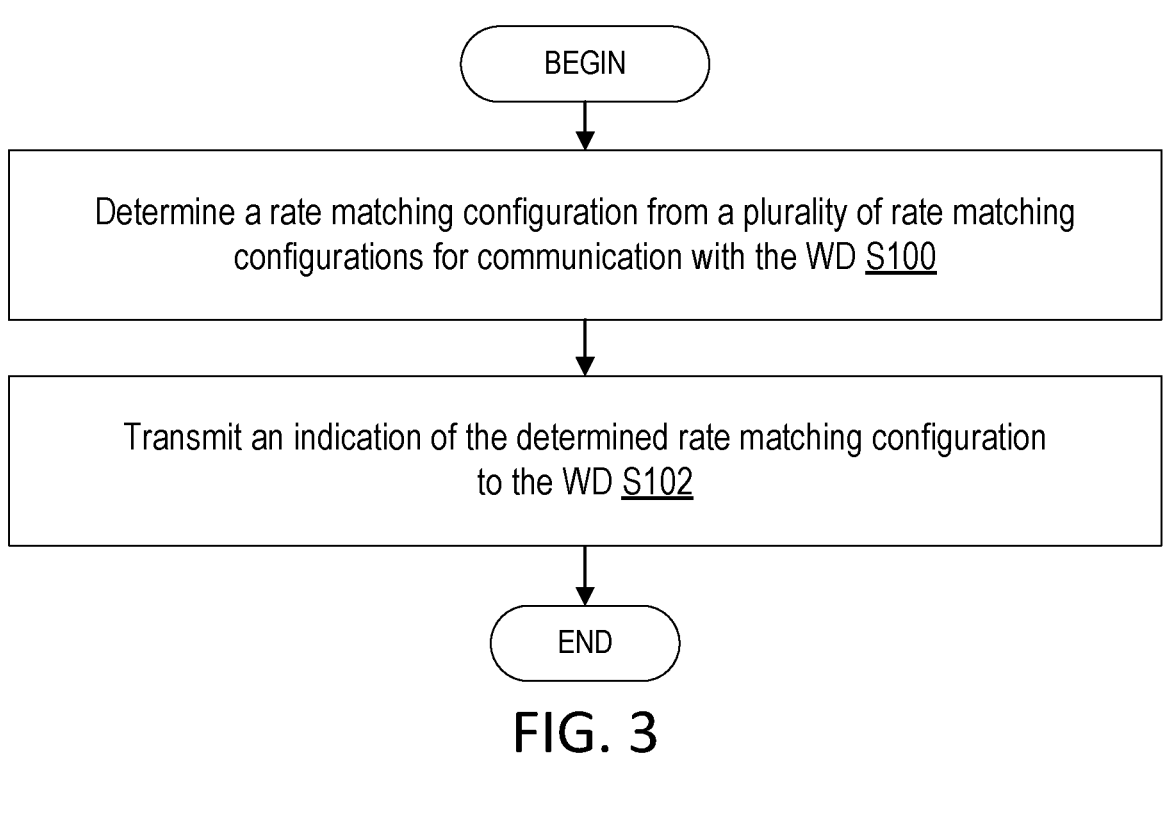
FIG. 3 is a flowchart of an example method implemented in a network node for enhanced fast CRS rate matching selection according to one embodiment of the present disclosure.

FIG. 3 is a flowchart of an exemplary process (i.e., method) in a network node 16 for enhanced fast common reference signal rate matching selection in dynamic spectrum sharing. One or more Blocks and/or functions and/or methods performed by network node 16 may be performed by one or more elements of network node 16 such as by node rate matching unit 28 in processing circuitry 42, processor 44, communication interface 34, radio interface 36, etc. The example method includes determining (Block S100), such as via node rate matching unit 28, processing circuitry 42, processor 44, communication interface 34 and/or radio interface 36, a rate matching configuration from a plurality of rate matching configurations for communication with the WD. The method further includes transmitting (Block S102), such as via node rate matching unit 28, processing circuitry 42, processor 44, communication interface 34 and/or radio interface 36, an indication of the determined rate matching configuration to the WD 22.

In some embodiments of this aspect, the method further includes determining that the WD 22 supports rate matching, including a Downlink Control Information (DCI) based Common Reference Signal (CRS) rate matching. The method also includes generating the plurality of rate matching configurations, where each of the plurality of rate matching configurations are selectable based at least on a DCI field. The DCI field indicates at least one of a semi-static rate matching configuration and a CRS rate matching configuration. The method further includes transmitting to the WD 22 the plurality of rate matching configurations.

In some other embodiments, the indication of the determined rate matching configuration is one of DCI and a MAC layer command, and the method further includes transmitting a second message in a predetermined time slot, where the second message indicates a value that causes the WD 22 to one of determine whether a set of resource elements are available for a Physical Downlink Shared Channel (PDSCH) in a first set of time slots and determine whether a set of resource elements indicated by a first rate matching configuration and indicated by a second rate matching configuration of the plurality of rate matching configurations are available for the PDSCH in the first set of time slots. The first set of time slots are indicated at least by one of the second message and another message different from the second message. Also, the first set of time slots include one of a first subset of time slots including a scheduled PDSCH, the scheduled PDSCH being scheduled at least by a Physical Downlink Control Channel (PDCCH) DCI format, a second subset of time slots being received after the predetermined time slot, a third subset of time slots being received after a Hybrid Automatic Repeat Request Acknowledgment (HARQ-ACK) is transmitted by the WD 22 in response to a first command detected in the predetermined time slot, and a fourth subset of time slots determined by the WD 22 based on a bitfield provided in a second command. The bitfield includes at least a CRS rate matching duration.

According to an embodiment, determining the rate matching configuration from the plurality of rate matching configurations for communication with the WD 22 further includes measuring a load associated with at least one of the first RAT and the second RAT, determining a resource for each one of the first RAT and the second RAT, and selecting the rate matching configuration. The rate matching configuration is the CRS rate matching configuration. The selecting of the rate matching includes, when physical resources are allocated for the first RAT, muting a Long Term Evolution (LTE) CRS and indicating in DCI that CRS rate matching may be omitted and determining a number of subframes corresponding to the muted LTE CRS. The selecting of the rate matching further includes reconfiguring one rate matching configuration from a plurality of rate matching configurations based on the number of subframes and transmitting the one rate matching configuration to the WD 22 and other WDs.

In another embodiment, determining the rate matching configuration from the plurality of rate matching configurations for communication with the WD 22 is based at least in part on a neighbor interference and includes determining a radio channel condition associated with one of the first RAT and the second RAT, measuring a load of neighboring cells associated with one of the first RAT and the second RAT, identifying an interfered rate matching configuration based on the radio channel condition and the load of neighboring cells, and excluding the interfered rate matching configuration from the plurality of rate matching configurations.

In some embodiments, the method further includes evaluating and learning the rate matching configuration based at least on Key Parameter Indicators (KPIs), a muted CRS on LTE, and adjustments associated with wireless devices 22 operating on New Radio (NR).

Figure 4:
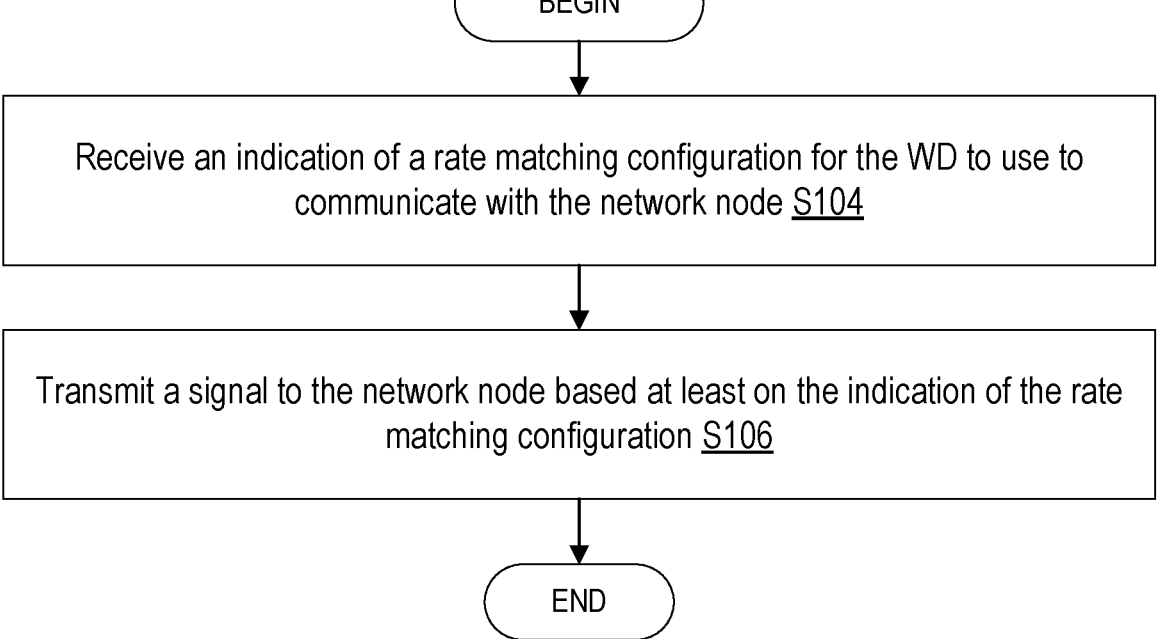
FIG. 4 is a flowchart of an example method implemented in a WD for enhanced fast CRS rate matching selection according to one embodiment of the present disclosure.

FIG. 4 is of an example process (i.e., method) implemented in a WD 22 for enhanced fast CRS rate matching selection. One or more Blocks and/or functions and/or methods performed by the WD 22 may be performed by one or more elements of WD 22, such as WD rate matching unit 30 in processing circuitry 58, processor 60, communication interface 54, radio interface 52, etc. according to the example method. The WD rate matching unit 30 may be an optional feature. The example method includes receiving (Block S104), such as via WD rate matching unit 30, processing circuitry 58, processor 60, communication interface 54 and/or radio interface 52, an indication of a rate matching configuration for the WD 22 to use to communicate with the network node 16. The method further includes transmitting (Block S106), such as via WD rate matching unit 30, processing circuitry 58, processor 60, communication interface 54 and/or radio interface 52, a signal to the network node 16 based at least on the indication of the rate matching configuration.

According to some embodiments, the method further includes transmitting a message indicating that the WD 22 supports rate matching, including a Downlink Control Information (DCI) based Common Reference Signal (CRS) rate matching. The method also includes receiving a plurality of rate matching configurations. Each of the plurality of rate matching configurations being selectable based at least on a DCI field, the DCI field indicating at least one of a semi-static rate matching configuration and a CRS rate matching configuration.

In some other embodiments, the indication of the rate matching configuration is one of DCI and a MAC layer command, and the method also includes receiving a second message in a predetermined time slot. The second message indicates a value that causes the WD 22 to one of determine whether a set of resource elements are available for a Physical Downlink Shared Channel (PDSCH) in a first set of time slots and determine whether a set of resource elements indicated by a first rate matching configuration and indicated by a second rate matching configuration of the plurality of rate matching configurations are available for the PDSCH in the first set of time slots. The first set of time slots is indicated at least by one of the second message and another message different from the second message. The first set of time slots includes one of a first subset of time slots including a scheduled PDSCH, the scheduled PDSCH being scheduled at least by a Physical Downlink Control Channel (PDCCH) DCI format, a second subset of time slots being received after the predetermined time slot, a third subset of time slots being received after a Hybrid Automatic Repeat Request Acknowledgment (HARQ-ACK) is transmitted by the WD 22 in response to a first command detected in the predetermined time slot, and a fourth subset of time slots determined by the WD 22 based on a bitfield provided in a second command. The bitfield includes at least a CRS rate matching duration.

In one embodiment, receiving an indication of the rate matching configuration causes the WD 22 to select from at least one of the received plurality of rate matching configurations for the WD 22 to communicate with the network node.

FIG. 5 is a flowchart of another exemplary process (i.e., method) in a network node 16. One or more Blocks and/or functions and/or methods performed by network node 16 may be performed by one or more elements of network node 16 such as by node rate matching unit 28 in processing circuitry 42, processor 44, communication interface 34, radio interface 36, etc. The example method includes determining (Block S107), such as via node rate matching unit 28, processing circuitry 42, processor 44, communication interface 34 and/or radio interface 36, a rate matching configuration from a plurality of rate matching configurations for communication with the WD 22. The method further includes transmitting (Block S108), such as via node rate matching unit 28, processing circuitry 42, processor 44, communication interface 34 and/or radio interface 36, an indication of the determined rate matching configuration to the WD 22 and using the determined rate matching configuration in at least another transmission towards the WD (22).

In some embodiments of this aspect, the method further includes determining that the WD 22 supports rate matching, including a Downlink Control Information (DCI) based Common Reference Signal (CRS) rate matching. The method also includes generating the plurality of rate matching configurations, where each of the plurality of rate matching configurations are selectable based at least on a DCI field. The DCI field indicates at least one of a semi-static rate matching configuration and a CRS rate matching configuration. The method further includes transmitting to the WD 22 the plurality of rate matching configurations.

In some other embodiments, the indication of the determined rate matching configuration is one of DCI and a MAC layer command.

In one embodiment, method further includes transmitting at least one of a first message and a second message in a predetermined time slot, the second message indicating a value that causes the WD 22 to at least one of: determine whether a set of resource elements are available for a Physical Downlink Shared Channel, PDSCH, in a first set of time slots; and determine whether another set of resource elements indicated by a first rate matching configuration and indicated by a second rate matching configuration of the plurality of rate matching configurations are available for the PDSCH in the first set of time slots. The first set of time slots are indicated at least by one of the second message and another message different from the second message, the second message including the indication.

In one other embodiment, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD 22 in response to the command detected in the PDCCH DCI format; and determined by the WD 22 by a predetermined bitfield provided in the second message.

In another embodiment, determining the rate matching configuration from the plurality of rate matching configurations for communication with the WD 22 further includes: measuring a load associated with at least one of the first RAT and the second RAT; determining a resource for each one of the first RAT and the second RAT; and selecting the rate matching configuration. The rate matching configuration is the CRS rate matching configuration.

In some embodiments, selecting the rate matching includes, when physical resources are allocated for the first RAT: muting a Long Term Evolution, LTE, CRS and indicating in DCI that CRS rate matching may be omitted; and determining a number of subframes corresponding to the muted LTE CRS. Selecting the rate matching further includes: reconfiguring one rate matching configuration from the plurality of rate matching configurations based on the number of subframes; and transmitting the reconfigured one rate matching configuration to the WD 22 and other WDs.

In some other embodiments, determining the rate matching configuration from the plurality of rate matching configurations for communication with the WD 22 is based at least in part on a neighbor interference.

In one embodiment, determining the rate matching configuration from the plurality of rate matching configurations for communication with the WD 22 includes: determining a radio channel condition associated with one of the first RAT and the second RAT; measuring a load of neighboring cells associated with one of the first RAT and the second RAT; identifying an interfered rate matching configuration based on the radio channel condition and the load of neighboring cells; and including at least one neighboring rate matching pattern in the plurality of rate matching configurations, the at least one neighboring rate matching pattern excluding at least one resource element associated with the interfered rate matching configuration.

In some embodiments, the method further includes evaluating and learning the rate matching configuration based at least on Key Performance Indicators (KPIs), a muted CRS on LTE, and adjustments associated with wireless devices 22 operating on New Radio (NR).

FIG. 6 is of another example process (i.e., method) implemented in a WD 22. One or more Blocks and/or functions and/or methods performed by the WD 22 may be performed by one or more elements of WD 22, such as WD rate matching unit 30 in processing circuitry 58, processor 60, communication interface 54, radio interface 52, etc. according to the example method. The WD rate matching unit 30 may be an optional feature. The example method includes receiving (Block S109), such as via WD rate matching unit 30, processing circuitry 58, processor 60, communication interface 54 and/or radio interface 52, an indication of a rate matching configuration for the WD 22 to use to communicate with the network node 16. The method further includes at least one of (Block S110) transmit to and receive from the network node 16, such as via WD rate matching unit 30, processing circuitry 58, processor 60, communication interface 54 and/or radio interface 52, a signal based at least on the indication of the rate matching configuration. The signal may include: feedback such as HARQ feedback (e.g., when the signal is transmitted to the network node 16); and/or a transmission from the network node 16 using a rate matching configuration (e.g., when the signal is received from the network node 16).

In another embodiment, the method further includes transmitting a message indicating that the WD 22 supports rate matching, including a Downlink Control Information, DCI, based Common Reference Signal, CRS, rate matching.

In some embodiments, the method further includes receiving a plurality of rate matching configurations, each of the plurality of rate matching configurations being selectable based at least on a DCI field, the DCI field indicating at least one of a semi-static rate matching configuration and a CRS rate matching configuration.

In one embodiment, the indication of the rate matching configuration is one of DCI and a MAC layer command.

In another embodiment, wherein the method further includes: receiving at least one of a first message and a second message in a predetermined time slot, the second message indicating a value that causes the WD 22 to at least one of: determine whether a set of resource elements are available for a Physical Downlink Shared Channel, PDSCH, in a first set of time slots; and determine whether another set of resource elements indicated by a first rate matching configuration and indicated by a second rate matching configuration of the plurality of rate matching configurations are available for the PDSCH in the first set of time slots.

In some embodiments, the first set of time slots is indicated at least by one of the second message and another message different from the second message, the second message including the indication.

In some other embodiments, the first set of time slots includes at least one slot one of: in which the PDSCH is scheduled by a Physical Downlink Control Channel, PDCCH, DCI format; received after the PDCCH DCI format is detected; received after a Hybrid Automatic Repeat Request Acknowledgement, HARQ-ACK, is transmitted by the WD 22 in response to the command detected in the PDCCH DCI format; and determined by the WD 22 by a predetermined bitfield provided in the second message.

In one embodiment, the bitfield includes at least a CRS rate matching duration.

In another embodiment, the rate matching configuration is based on at least one of: a radio channel condition associated with one of the first RAT and the second RAT; and a load of neighboring cells associated with one of the first RAT and the second RAT.

In some embodiments, receiving the indication of the rate matching configuration causes the WD 22 to select from at least one of the received plurality of rate matching configurations for the WD 22 to communicate with the network node 16.

Having described the general process flow of arrangements of the disclosure and having provided examples of hardware and software arrangements for implementing the processes and functions of the disclosure, the sections below provide details and examples of arrangements for physical distancing tracking and notification, which may be implemented by the network node 16 and/or one or more wireless devices 22.

Figure 7:
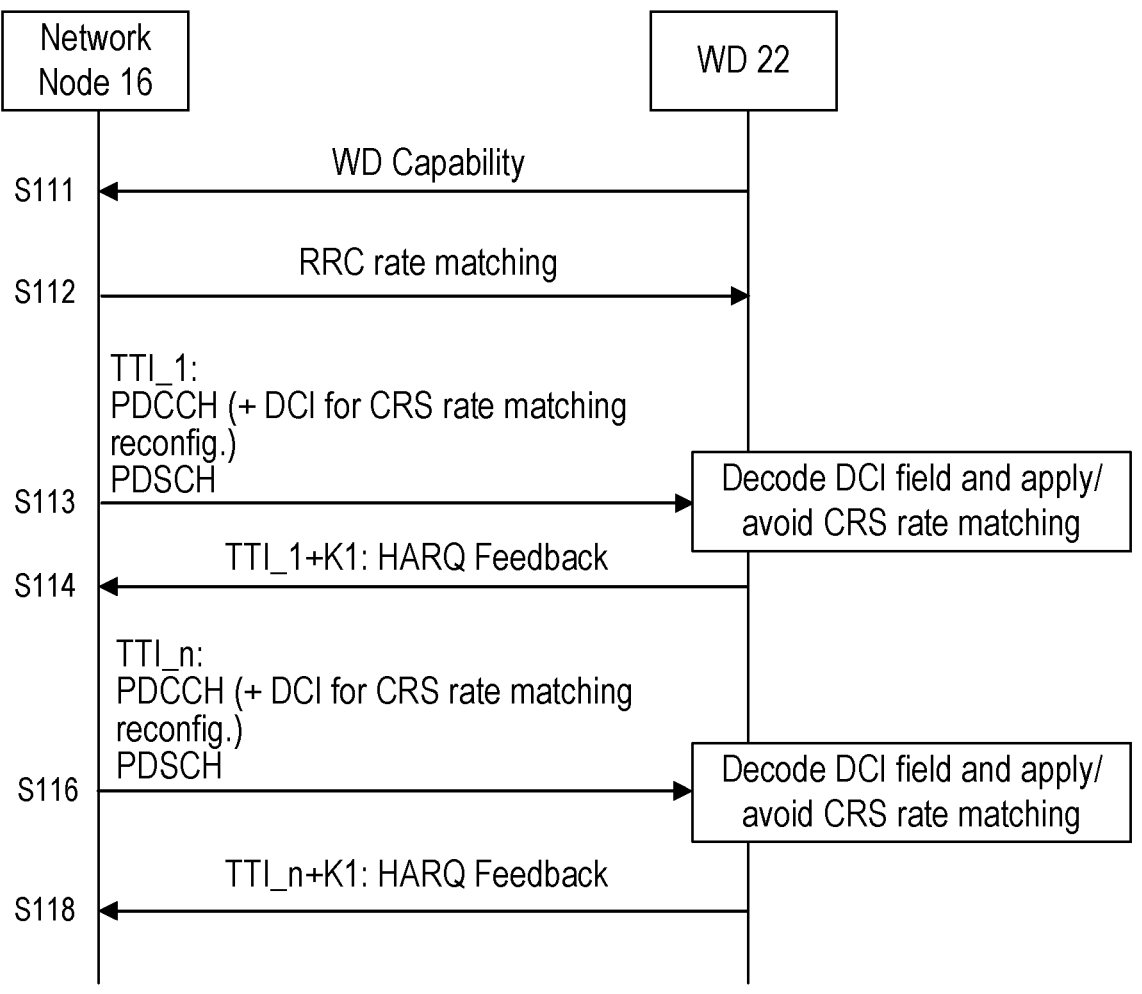
FIG. 7 is signal diagram of an example of signaling exchanges between a network node and a WD using DCI based CRS rate matching selection according to one embodiment of the present disclosure.

FIG. 7 shows an example of a signaling exchange between a network node 16, e.g., gNB, and a WD 22 using DCI based CRS rate matching selection. At step S111, the WD 22 transmits a message including WD capability that is received by the network node 16. At step S112, the network node 16 transmits RRC rate matching to the WD 22. At step S113, at TTI_1, a transmission is made by the network node 16 including PDCCH and PDSCH. PDCCH may include DCI for CRS rate matching reconfiguration. Then, the WD 22 decodes the DCI field and applies/disables CRS rate matching. At step S114, the WD 22 transmits, at TTI_1+K1, a Hybrid Automatic Repeat Request (HARQ) feedback. K1 being a certain amount of time such as a predetermined amount of time or a time elapsed between a TTI and a DL transmission in response to the TTI. Steps S113 and S114 may be repeated a plurality of times. In a non-limiting example, Steps S113 and S114 may be repeated up to a n number of times, such that at step S116, at TTI_n, a transmission is made by the network node 16 including PDCCH and PDSCH. PDCCH may include DCI for CRS rate matching reconfiguration. Then, the WD 22 decodes the DCI field and applies/disables CRS rate matching. At step S118, the WD 22 transmits, at TTI_n+K1, a Hybrid Automatic Repeat Request (HARQ) feedback.

Figure 8:
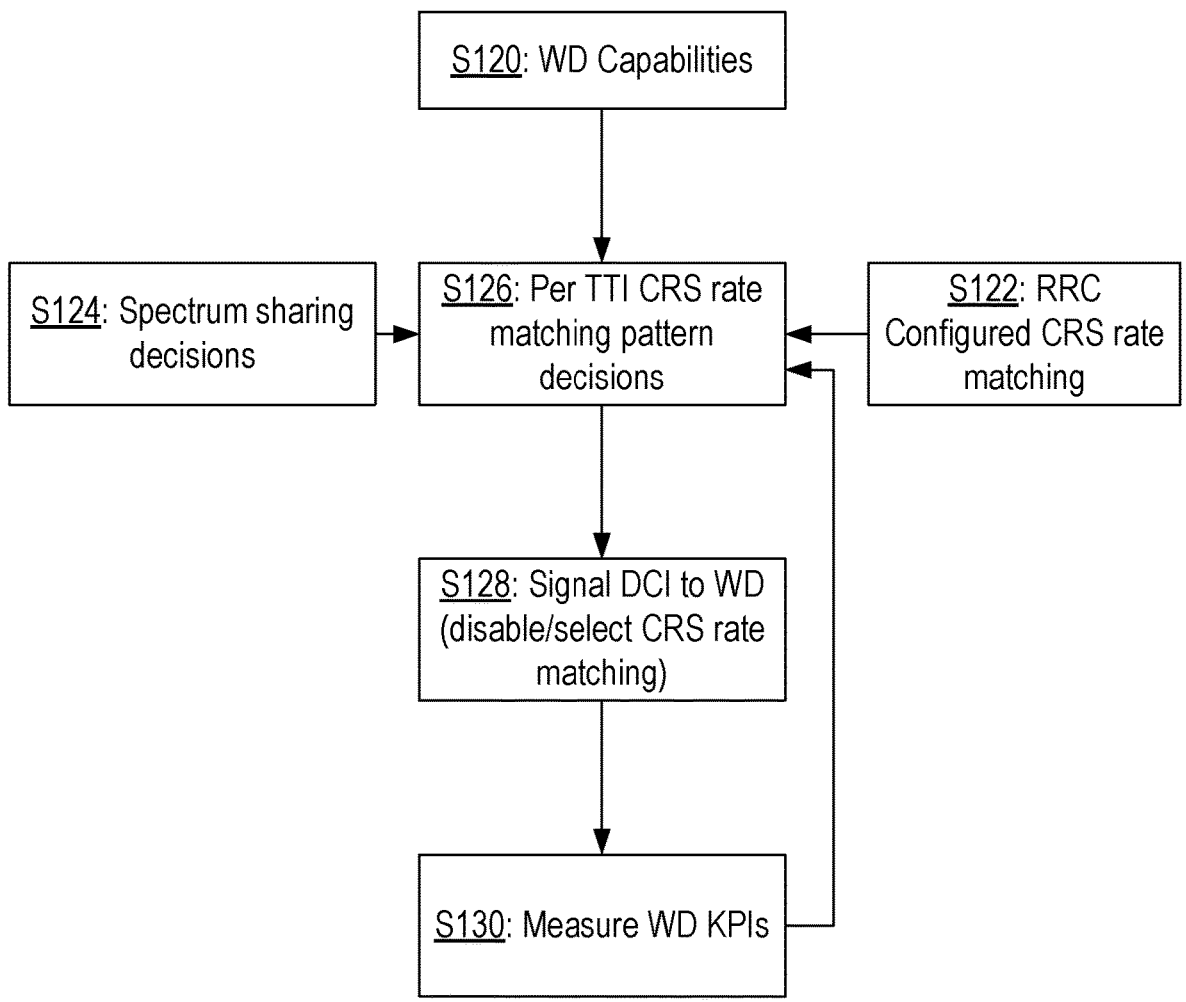
FIG. 8 is flow chart of an example of CRS rate matching selection according to one embodiment of the present disclosure.

FIG. 8 shows a flowchart of an example process of fast CRS rate matching selection. In one embodiment, according at least to some of the steps and features shown in FIGS. 7 and 8, enhanced fast CRS rate matching selection in DSS may include at least one of the following steps shown in FIG. 8:

S120: Identify capable WDs 22 of fast CRS rate matching indicator

S122: Construct different rate matching patterns and configure them in the WD 22. This step may generate different rate matching patterns, e.g., signaled to the WD 22 using RRC messages during early connection.

S124: Generate spectrum sharing decisions, which may include spectrum split between WDs 22 operating under LTE and WDs 22 operating under NR at each subframe. Decisions may be based on an amount of PRBs needed to satisfy a requested traffic on each Radio Access Technology (RAT) under channel conditions of each RAT and Quality of Service (QoS) requirements.

S126: Select a rate matching configuration for each WD 22 at TTI/slot-level, which may include multiple patterns applied simultaneously for some WDs 22 to cancel neighboring interference, and/or disabling a rate matching pattern to adjust spectral efficiency, and/or mute an LTE CRS.

S128: Signal a selected configuration to a WD 22. This step may utilize the fast configuration of CRS rate matching pattern for WDs 22 that are capable.

S130: Evaluate and learn a configuration, e.g., an optimal configuration. This step may include collecting WD Key Performance Indicators (KPIs), e.g., for both LTE and NR, to adjust/enhance future decisions, where the impact of muting CRS to WDs 22 operating under LTE and the adjustments/enhancements to WDs 22 operating under NR are assessed.

The following are nonlimiting embodiments that describe at least some of the steps and features shown at least in FIGS. 5 and 6.

Embodiment 1: Identifying Capable WDs and Selecting a Configuration

WD capability: A WD capability group or field is provided in RRC signaling to indicate that the WD is capable of handling fast rate matching configuration.

Legacy configurations, e.g., RRC configurations: when a WD 22 does not signal in its WD capability that the WD 22 can utilize fast rate matching changes, an original, e.g., slow, process of RRC reconfiguration, coupled with existing DCI signaling of semi-static rate matching patterns, may be used for that WD 22.

Rate matching configurations: RRC messages may be transmitted, where the RRC messages configure possible CRA rate matching patterns and at least a DCI field that indicates to the WD 22 which rate matching pattern is to be used, e.g., taking into account interaction with NR semi-static rate matching.

2 Bits in DCI field each slot may have one of the following values, which may indicate as follows:

00: indicating not to apply semi-static rate matching, and not to apply CRS rate matching;

01: indicating not to apply semi-static rate matching, and to apply CRS rate matching;

10: indicating to apply semi-static rate matching, and not to apply CRS rate matching; and 11: indicating to apply semi-static rate matching, and to apply CRS rate matching.

In some embodiments, if the DCI field is missing, WD 22 may apply a last received value or may use a default value, e.g., 01.

Embodiment 2: Selecting Between Configured CRS Rate Matching Patterns

Embodiment provides an additional DCI field to select between configured CRS rate matching patterns as follows.

RRC message: indicates 3 CRS rate matching patterns;

Additional DCI field, e.g., 3 bits, which may indicate the following:

000: indicating no CRS rate matching;

001: indicating to apply CRS rate matching pattern with index 0;

. . .

111: indicating to apply all CRS rate matching patterns configured by the RRC messages.

Embodiment 3: Details of WD Behavior Upon Receiving Messages According to Embodiments 1 and 2

A WD 22 operating on at least a first RAT, e.g., NR, receives a first message. The first message can be an RRC layer message and provides one or more patterns to rate match around LTE CRS. The WD may also detect a second message.

According to a nonlimiting example (eg1a), if the WD 22 detects the second message in slot x with one or more bits indicating a first value (e.g., 0 or 1), the WD 22 determines that a set of REs that are indicated by a configuration in the RRC message are available for PDSCH in a first set of a plurality of slots. Otherwise (e.g., when second message is not detected, the bits indicate a value other than first value), the WD 22 determines that the set of REs that are indicated by the configuration in the RRC message are not available for PDSCH in the first set of slots.

In another nonlimiting example (eg1b), if the WD 22 detects the second message in slot x with one or more bits indicating a first value, the WD determines that a set of REs that are indicated by a configuration in the RRC message are not available for PDSCH in a first set of slots of a plurality of slots. Otherwise, the WD 22 determines that the set of REs that are indicated by the configuration in the RRC message are available for PDSCH in the first set of the plurality of slots.

In yet another example (eg2), an RRC message provides configurations corresponding to at least a first pattern and a second pattern to rate match around LTE CRS. If the WD 22 detects the second message in slot x, the WD 22 may determine one or more of the following based on one or more bits in the second message:

a set of REs, which are indicated by a configuration corresponding to the first pattern, are not available for PDSCH in a first set of slots, and a set of REs, which that are indicated by a configuration corresponding to the second pattern, are available for PDSCH in the first set of slots;

a set of REs, which are indicated by a configuration corresponding to the first pattern and a configuration corresponding to the second pattern, are available for PDSCH in the first set of slots;

a set of REs, which are indicated by a configuration corresponding to the first pattern and a configuration corresponding to the second pattern, are not available for PDSCH in the first set of slots.

The second message may be a PDCCH with DCI according to a particular format. According to a nonlimiting example, the second message can be a PDCCH with a DCI format used for scheduling PDSCH for the WD 22 (e.g., DCI format 1_1, 1_2 in NR).

In another nonlimiting example, the second message can be a MAC layer command. In yet another nonlimiting example, where the second message is a MAC layer command, the WD 22 may determine that the set of REs that are indicated by the configuration in the RRC message are not available for PDCCH and/or PDSCH in the first set of slots.

The first set of slots may be implicitly determined by the WD 22 based on slot x in which the second command is detected. The following are nonlimiting examples:

The first set of slots may be the slot x in which the second command is detected. In another example, if the second command is a PDCCH with a DCI format used for scheduling PDSCH, the first set of slots can be the slots in which PDSCH is scheduled by the PDCCH DCI format.

The first set of slots may include slots that are received after slot x.

The first set of slots can include slots that are received after a HARQ-ACK is transmitted by the WD 22 in response to the command detected in slot x.

The first set of slots can be determined by the WD 22 by a specific bitfield (e.g., duration of CRS rate matching) provided in the second command.

The one or more bits in the second message may be bits corresponding to a "Rate matching indicator" field in the second message. Based on RRC configuration, the WD 22 may use the bits to determine applicability of CRS rate matching patterns and/or other symbol/PRB level rate matching patterns in the first set of slots based on the bits in the "Rate matching indicator" field. The one or more bits in the second message may be bits corresponding to a 'CRS Rate matching indicator field' that is used for determining applicability of the one or more patterns to rate match around LTE CRS for the first set of slots. The 'CRS Rate matching indicator field' may also be a separate field from a "Rate matching indicator" indicator field that is used for determining applicability of symbol/PRB level rate matching patterns.

According to another nonlimiting example, the first message may provide one or more configurations with following information elements:

Bandwidth (BW) of an LTE carrier in number of PRBs;
Center frequency of an LTE carrier;
LTE MBSFN subframe configuration;
Number of LTE CRS antenna ports to rate-match around; and
Shifting value v-shift in LTE to rate match around LTE CRS.

The information elements may correspond to one or more LTE carriers that are overlapping or non-overlapping in frequency. The WD 22 can determine CRS positions within a given slot based on such information. A set of REs, e.g., indicated by the configuration in the RRC message, may be REs that correspond to CRS positions.

Embodiment 4: Load-Based Configuration

Embodiment 4 illustrates how a network node 16, e.g., a network controller accessing eNB and gNB, may determine a rate matching pattern to be signaled to WDs 22 operating on NR.

LTE and NR loads are measured, e.g., number of users, needed PRBs, requested bits. A resource for each RAT is determined based on channel conditions and priority, e.g., configured by operators. CRS rate matching configuration is selected. In one nonlimiting example, CRS rate matching configuration may be selected as follows:

IF all PRBs of the slot are allocated for NR AND no WD 22 operating on LTE is performing CRS measurements AND WDs 22 operating on LTE can afford muting CRS without explicit RRC signaling, then:
Mute LTE CRS; and
Indicate to NR no CRS rate matching needed in the DCI;
ENDIF In cases of WDs 22 that are impacted and operating on LTE due to muting LTE CRS without explicit MBSFN indication, a number of subframes in which LTE CRS was muted is determined. In addition, one rate matching pattern that aligns with selected number of subframes, such as without CRS, is reconfigured, and WDs 22 operating on either or both of LTE and NR are informed, e.g., through RRC messages.

Figure 9:
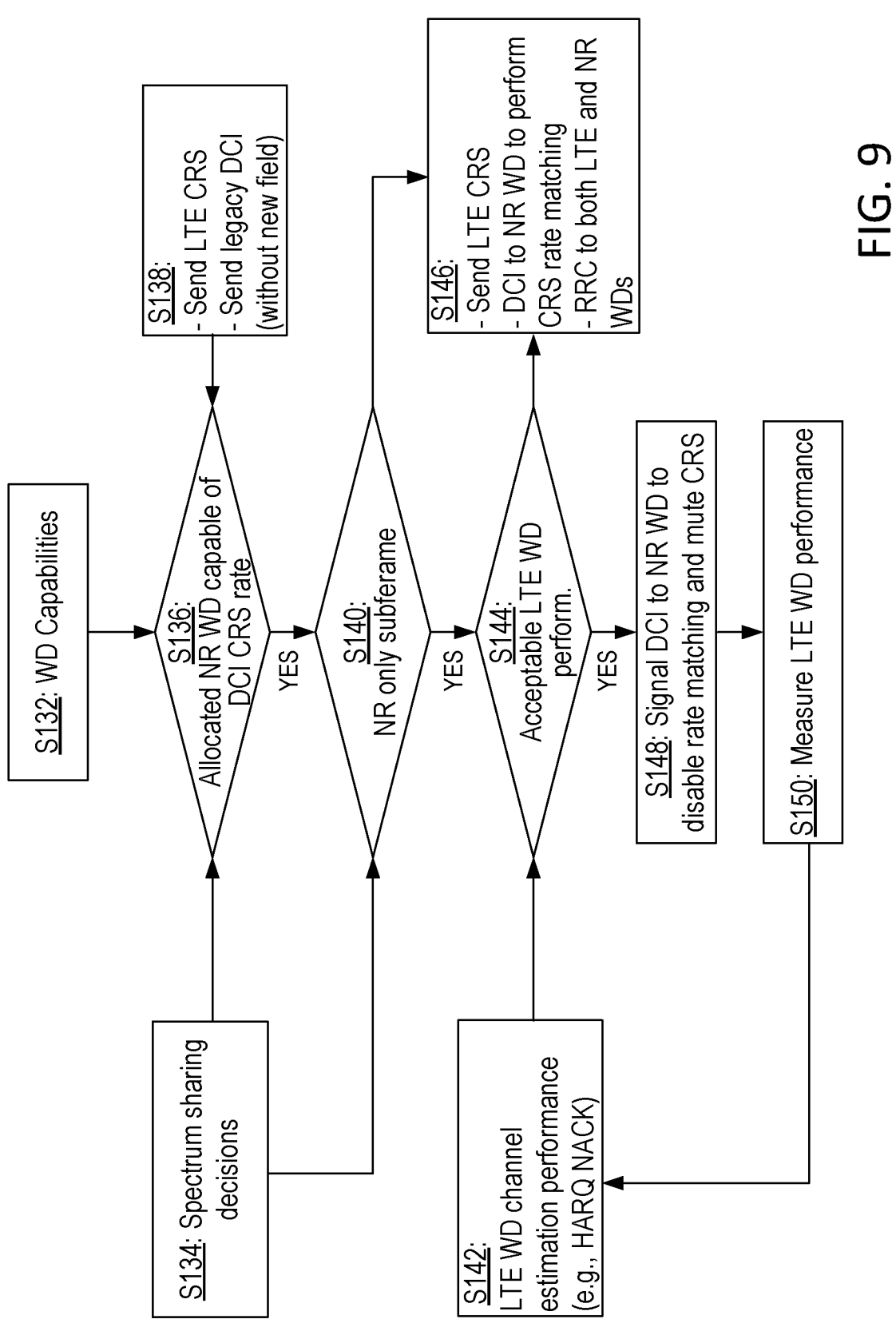
FIG. 9 is flow chart of an example of a load-based configuration according to one embodiment of the present disclosure.

More specifically, a flow chart showing the steps performed according to Embodiment 4 is illustrated in FIG. 9. At step S32, WD capabilities are received and/or determined. At step S134, spectrum sharing decisions are performed. In addition, at step S136, a determination is performed of whether WDs 22 operating on NR and capable of DCI CRS are allocated. If no WDs 22 operating on NR and capable of DCI CRS are allocated, at step S138, at least an LTE CRS and/or legacy DCI is transmitted, such as DCI without indications for rate matching. If WDs 22 operating on NR and capable of DCI CRS are allocated, at step S140, based in part on the decisions of step S134, a determination of whether a subframe is NR only is performed. At step S142, an LTE WD channel estimation performance is determined, such as HARQ NACK.

If a subframe is NR only, at step S144, a determination of whether an acceptable performance of WD operating on LTE is determined based in part on the determined LTE WD channel estimation performance. At step S146, at least any one of the following is performed: transmitting LTE CRS, transmitting DCI to WDs 22 on NR to perform CRS rate matching, and transmitting RRC to WDs 22 on both or on either one of LTE and NR. If an acceptable performance of WD operating on LTE is determined, DCI is signaled at step S148 to WDs 22 operating on NR to disable rate matching and to mute CRS. At step S150, performance of WDs 22 operating on LTE is measured/determined, which may be utilized at step S142.

Embodiment 5: Interference-Based Configuration

The embodiment shows how a network node 16, e.g., a network controller, may select a fast rate matching pattern based on neighbor interference, which may include the following steps:

Detect WDs 22 operating on NR under undesirable radio conditions, which may be based on Reference Signal Received Power (RSRP) measurements, Channel Quality Information (CQI) measurements, and/or HARQ ACK/NACK.
Measure the load of neighboring LTE cells (i.e., identify if CRS is the reason of inference), which may be obtained through inter-cell coordination to exchange load conditions and/or measure a level of Downlink (DL) interference and/or Block Error Rate (BLER) on different slots and PRBs, where static levels indicate CRS as main contributor and vice-versa.
Identify a CRS pattern of a strong interferer, based on Physical Cell Id (PCI) either known by an operator or detected by the WD 22 through automatic neighbor relation (ANR). In one nonlimiting example, the CRS pattern is determined as follows:
IF number of strong CRS interferers==0
Select either the CRS rate matching pattern of the serving cell, or disable CRS rate matching in some subframes 4 use Embodiment 3
ELSEIF number of strong CRS interferers==1
Select additional CRS rate matching pattern
ELSE
Use semi-static rate matching to block the entire symbol containing LTE CRS
ENDIF The following is a list of nonlimiting example embodiments:

Embodiment A1. A network node configured to communicate with a wireless device (WD) utilizing at least one of a first Radio Access Technology (RAT) and a second RAT, the network node configured to, and/or comprising a radio interface and/or comprising processing circuitry configured to:

determine a rate matching configuration from a plurality of rate matching configurations for communication with the WD; and transmit an indication of the determined rate matching configuration to the WD.

Embodiment A2. The network node of Embodiment A1, wherein the network node and/or the radio interface and/or the processing circuitry is further configured to:

determine that the WD supports rate matching, including a Downlink Control Information (DCI) based Common Reference Signal (CRS) rate matching;

generate the plurality of rate matching configurations, each of the plurality of rate matching configurations being selectable based at least on a DCI field, the DCI field indicating at least one of a semi-static rate matching configuration and a CRS rate matching configuration; and transmit to the WD the plurality of rate matching configurations.

Embodiment A3. The network node of any one of Embodiments A1 and A2, wherein the indication of the determined rate matching configuration is one of DCI and a MAC layer command, and the network node and/or the radio interface and/or the processing circuitry is further configured to:

transmit a second message in a predetermined time slot, the second message indicating a value that causes the WD to one of:

determine whether a set of resource elements are available for a Physical Downlink Shared Channel (PDSCH) in a first set of time slots; and determine whether a set of resource elements indicated by a first rate matching configuration and indicated by a second rate matching configuration of the plurality of rate matching configurations are available for the PDSCH in the first set of time slots;

the first set of time slots being indicated at least by one of the second message and another message different from the second message, the first set of time slots including one of:

a first subset of time slots including a scheduled PDSCH, the scheduled PDSCH being scheduled at least by a Physical Downlink Control Channel (PDCCH) DCI format;

a second subset of time slots being received after the predetermined time slot;

a third subset of time slots being received after a Hybrid Automatic Repeat Request Acknowledgment (HARQ-ACK) is transmitted by the WD in response to a first command detected in the predetermined time slot; and a fourth subset of time slots determined by the WD based on a bitfield provided in a second command, the bitfield including at least a CRS rate matching duration.

Embodiment A4. The network node of any one of Embodiments A1-A3, wherein determining the rate matching configuration from the plurality of rate matching configurations for communication with the WD further includes:

measuring a load associated with at least one of the first RAT and the second RAT;

determining a resource for each one of the first RAT and the second RAT; and selecting the rate matching configuration, the rate matching configuration being the CRS rate matching configuration, the selecting of the rate matching including:

when physical resources are allocated for the first RAT:

muting a Long Term Evolution (LTE) CRS and indicating in DCI that CRS rate matching may be omitted; and determining a number of subframes corresponding to the muted LTE CRS;

reconfiguring one rate matching configuration from a plurality of rate matching configurations based on the number of subframes; and transmitting the one rate matching configuration to the WD and other WDs.

Embodiment A5. The network node of any one of Embodiments A1-A4, wherein determining the rate matching configuration from the plurality of rate matching configurations for communication with the WD is based at least in part on a neighbor interference and includes:

determining a radio channel condition associated with one of the first RAT and the second RAT;

measuring a load of neighboring cells associated with one of the first RAT and the second RAT;

identifying an interfered rate matching configuration based on the radio channel condition and the load of neighboring cells; and excluding the interfered rate matching configuration from the plurality of rate matching configurations.

Embodiment A6. The network node of any one of Embodiments A1-A5, wherein the network node and/or the radio interface and/or the processing circuitry is further configured to:

evaluate and learn the rate matching configuration based at least on Key Performance Indicators (KPIs), a muted CRS on LTE, and adjustments associated with wireless devices operating on New Radio (NR).

Embodiment B1. A method implemented in a network node configured to communicate with a wireless device (WD) utilizing at least one of a first Radio Access Technology (RAT) and a second RAT, the method comprising:

determining a rate matching configuration from a plurality of rate matching configurations for communication with the WD; and transmitting an indication of the determined rate matching configuration to the WD.

Embodiment B2. The method of Embodiment B1, the method further including:

determining that the WD supports rate matching, including a Downlink Control Information (DCI) based Common Reference Signal (CRS) rate matching;

generating the plurality of rate matching configurations, each of the plurality of rate matching configurations being selectable based at least on a DCI field, the DCI field indicating at least one of a semi-static rate matching configuration and a CRS rate matching configuration; and transmitting to the WD the plurality of rate matching configurations.

Embodiment B3. The method of any one of Embodiments B1 and B2, wherein the indication of the determined rate matching configuration is one of DCI and a MAC layer command, the method further including:

transmitting a second message in a predetermined time slot, the second message indicating a value that causes the WD to one of:

determine whether a set of resource elements are available for a Physical Downlink Shared Channel (PDSCH) in a first set of time slots; and determine whether a set of resource elements indicated by a first rate matching configuration and indicated by a second rate matching configuration of the plurality of rate matching configurations are available for the PDSCH in the first set of time slots;

the first set of time slots being indicated at least by one of the second message and another message different from the second message, the first set of time slots including one of:

a first subset of time slots including a scheduled PDSCH, the scheduled PDSCH being scheduled at least by a Physical Downlink Control Channel (PDCCH) DCI format;

a second subset of time slots being received after the predetermined time slot;

a third subset of time slots being received after a Hybrid Automatic Repeat Request Acknowledgment (HARQ-ACK) is transmitted by the WD in response to a first command detected in the predetermined time slot; and a fourth subset of time slots determined by the WD based on a bitfield provided in a second command, the bitfield including at least a CRS rate matching duration.

Embodiment B4. The method of any one of Embodiments B1-B3, wherein determining the rate matching configuration from the plurality of rate matching configurations for communication with the WD further includes:

measuring a load associated with at least one of the first RAT and the second RAT;

determining a resource for each one of the first RAT and the second RAT; and selecting the rate matching configuration, the rate matching configuration being the CRS rate matching configuration, the selecting of the rate matching including:

when physical resources are allocated for the first RAT:

muting a Long Term Evolution (LTE) CRS and indicating in DCI that CRS rate matching may be omitted; and determining a number of subframes corresponding to the muted LTE CRS;

reconfiguring one rate matching configuration from a plurality of rate matching configurations based on the number of subframes; and transmitting the one rate matching configuration to the WD and other WDs.

Embodiment B5. The method of any one of Embodiments B1-B4, wherein determining the rate matching configuration from the plurality of rate matching configurations for communication with the WD is based at least in part on a neighbor interference and includes:

determining a radio channel condition associated with one of the first RAT and the second RAT;

measuring a load of neighboring cells associated with one of the first RAT and the second RAT;

identifying an interfered rate matching configuration based on the radio channel condition and the load of neighboring cells; and excluding the interfered rate matching configuration from the plurality of rate matching configurations.

Embodiment B6. The method of any one of Embodiments B1-B5, the method further including:

evaluating and learning the rate matching configuration based at least on Key Performance Indicators (KPIs), a muted CRS on LTE, and adjustments associated with wireless devices operating on New Radio (NR).

Embodiment C1. A wireless device (WD) configured to communicate with a network node utilizing at least one of a first Radio Access Technology (RAT) and a second RAT, the WD comprising a radio interface and processing circuitry, the WD configured to, and/or comprising a radio interface and/or processing circuitry configured to:

receive an indication of a rate matching configuration for the WD to use to communicate with the network node; and transmit a signal to the network node based at least on the indication of the rate matching configuration.

Embodiment C2. The WD of Embodiment C1, the WD and/or the radio interface and/or the processing circuitry is further configured to:

transmit a message indicating that the WD supports rate matching, including a Downlink Control Information (DCI) based Common Reference Signal (CRS) rate matching; and receive a plurality of rate matching configurations, each of the plurality of rate matching configurations being selectable based at least on a DCI field, the DCI field indicating at least one of a semi-static rate matching configuration and a CRS rate matching configuration.

Embodiment C3. The WD of Embodiment C2, wherein the indication of the rate matching configuration is one of DCI and a MAC layer command, and the WD and/or the radio interface and/or the processing circuitry is further configured to:

receive a second message in a predetermined time slot, the second message indicating a value that causes the WD to one of:

determine whether a set of resource elements are available for a Physical Downlink Shared Channel (PDSCH) in a first set of time slots; and determine whether a set of resource elements indicated by a first rate matching configuration and indicated by a second rate matching configuration of the plurality of rate matching configurations are available for the PDSCH in the first set of time slots;

the first set of time slots being indicated at least by one of the second message and another message different from the second message, the first set of time slots including one of:

a first subset of time slots including a scheduled PDSCH, the scheduled PDSCH being scheduled at least by a Physical Downlink Control Channel (PDCCH) DCI format;

a second subset of time slots being received after the predetermined time slot;

a third subset of time slots being received after a Hybrid Automatic Repeat Request Acknowledgment (HARQ-ACK) is transmitted by the WD in response to a first command detected in the predetermined time slot; and a fourth subset of time slots determined by the WD based on a bitfield provided in a second command, the bitfield including at least a CRS rate matching duration.

Embodiment C4. The WD of any one of Embodiments C2 and C3, wherein receiving an indication of the rate matching configuration causes the WD to select from at least one of the received plurality of rate matching configurations for the WD to communicate with the network node.

Embodiment D1. A method implemented in a wireless device (WD) configured to communicate with a network node utilizing at least one of a first Radio Access Technology (RAT) and a second RAT, the method comprising:

receiving an indication of a rate matching configuration for the WD to use to communicate with the network node; and transmitting a signal to the network node based at least on the indication of the rate matching configuration.

Embodiment D2. The method of Embodiment D1, the method further including:

transmitting a message indicating that the WD supports rate matching, including a Downlink Control Information (DCI) based Common Reference Signal (CRS) rate matching; and receiving a plurality of rate matching configurations, each of the plurality of rate matching configurations being selectable based at least on DCI field, the DCI field indicating at least one of a semi-static rate matching configuration and a CRS rate matching configuration.

Embodiment D3. The method of Embodiment D2, wherein the indication of the rate matching configuration is one of DCI and a MAC layer command, the method further including:

receiving a second message in a predetermined time slot, the second message indicating a value that causes the WD to one of:

determine whether a set of resource elements are available for a Physical Downlink Shared Channel (PDSCH) in a first set of time slots; and determine whether a set of resource elements indicated by a first rate matching configuration and indicated by a second rate matching configuration of the plurality of rate matching configurations are available for the PDSCH in the first set of time slots;

the first set of time slots being indicated at least by one of the second message and another message different from the second message, the first set of time slots including one of:

a first subset of time slots including a scheduled PDSCH, the scheduled PDSCH being scheduled at least by a Physical Downlink Control Channel (PDCCH) DCI format;

a second subset of time slots being received after the predetermined time slot;

a third subset of time slots being received after a Hybrid Automatic Repeat Request Acknowledgment (HARQ-ACK) is transmitted by the WD in response to a first command detected in the predetermined time slot; and a fourth subset of time slots determined by the WD based on a bitfield provided in a second command, the bitfield including at least a CRS rate matching duration.

Embodiment D4. The method of any one of Embodiments D2 and D3, wherein receiving an indication of the rate matching configuration causes the WD to select from at least one of the received plurality of rate matching configurations for the WD to communicate with the network node.

As will be appreciated by one of skill in the art, the concepts described herein may be embodied as a method, data processing system, and/or computer program product.

Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device (WD) utilizing at least one of a first Radio Access Technology (RAT) and a second RAT, the network node comprising processing circuitry configured to:
   determine a rate matching configuration from a plurality of rate matching configurations for communication with the WD;
   cause the network node to transmit an indication of the determined rate matching configuration to the WD and to use the determined rate matching configuration in at least one transmission towards the WD; and
   cause the network node to transmit a first message in a predetermined time slot, the first message indicating a value that causes the WD to at least one of:
      determine whether a set of resource elements are available for a Physical Downlink Shared Channel (PDSCH) in a set of time slots, the set of time slots including at least one slot of the set of time slots one of:
         in which the PDSCH is scheduled by a Physical Downlink Control Channel (PDCCH) Downlink Control Information (DCI) format;
         received after the PDCCH DCI format is detected;
         received after a Hybrid Automatic Repeat Request Acknowledgement (HARQ-ACK) is transmitted by the WD in response to the command detected in the PDCCH DCI format; and
         determined by the WD by a predetermined bitfield provided in the first message; and
      determine whether a second set of resource elements indicated by a first rate matching configuration and indicated by a second rate matching configuration of the plurality of rate matching configurations are available for the PDSCH in the set of time slots, the set of time slots being indicated at least by one of the first message and a second message different from the first message.

2. The network node of claim 1, wherein the processing circuitry is further configured to:
   determine that the WD supports rate matching, including a Downlink Control Information (DCI) based Common Reference Signal (CRS) rate matching;

generate the plurality of rate matching configurations, each of the plurality of rate matching configurations being selectable based at least on a DCI field, the DCI field indicating at least one of a semi-static rate matching configuration and a CRS rate matching configuration; and
   cause the network node to transmit to the WD the plurality of rate matching configurations.

3. The network node of claim 2, wherein determining the rate matching configuration from the plurality of rate matching configurations for communication with the WD further includes:
   measuring a load associated with at least one of the first RAT and the second RAT;
   determining a resource for each one of the first RAT and the second RAT; and
   selecting the rate matching configuration, the rate matching configuration being the CRS rate matching configuration.

4. The network node of claim 3, wherein the selecting the rate matching includes:
   when physical resources are allocated for the first RAT:
      muting a Long Term Evolution (LTE) CRS and indicating in DCI that CRS rate matching may be omitted; and
      determining a number of subframes corresponding to the muted LTE CRS;
   reconfiguring one rate matching configuration from the plurality of rate matching configurations based on the number of subframes; and
   causing the network node to transmit the reconfigured one rate matching configuration to the WD and other WDs.

5. The network node of claim 1, wherein the indication of the determined rate matching configuration is one of DCI and a Medium Access Control (MAC) layer command.

6. The network node of claim 1, wherein determining the rate matching configuration from the plurality of rate matching configurations for communication with the WD is based at least in part on a neighbor interference.

7. The network node of claim 1, wherein determining the rate matching configuration from the plurality of rate matching configurations for communication with the WD includes:
   determining a radio channel condition associated with one of the first RAT and the second RAT;
   measuring a load of neighboring cells associated with one of the first RAT and the second RAT;
   identifying an interfered rate matching configuration based on the radio channel condition and the load of neighboring cells; and
   including at least one neighboring rate matching pattern in the plurality of rate matching configurations, the at least one neighboring rate matching pattern excluding at least one resource element associated with the interfered rate matching configuration.

8. The network node of claim 1, wherein the processing circuitry is further configured to:
   evaluate and learn the rate matching configuration based at least on Key Performance Indicators (KPIs) a muted Common Reference Signal (CRS) on Long Term Evolution (LTE), and adjustments associated with wireless devices operating on New Radio (NR).

9. A method implemented in a network node configured to communicate with a wireless device (WD) utilizing at least one of a first Radio Access Technology (RAT) and a second RAT, the method comprising:

determining a rate matching configuration from a plurality of rate matching configurations for communication with the WD;

transmitting an indication of the determined rate matching configuration to the WD and using the determined rate matching configuration in at least one transmission towards the WD; and transmitting a first message in a predetermined time slot, the first message indicating a value that causes the WD to at least one of:

determine whether a set of resource elements are available for a Physical Downlink Shared Channel (PDSCH) in a set of time slots, the set of time slots including at least one slot of the set of time slots one of:

in which the PDSCH is scheduled by a Physical Downlink Control Channel (PDCCH) Downlink Control Information (DCI) format;

received after the PDCCH DCI format is detected;

received after a Hybrid Automatic Repeat Request Acknowledgement (HARQ-ACK) is transmitted by the WD in response to the command detected in the PDCCH DCI format; and determined by the WD by a predetermined bitfield provided in the first message; and determine whether a second set of resource elements indicated by a first rate matching configuration and indicated by a second rate matching configuration of the plurality of rate matching configurations are available for the PDSCH in the set of time slots, the set of time slots being indicated at least by one of the first message and a second message different from the first message.

10. The method of claim 9, wherein method further includes:

determining that the WD supports rate matching, including a Downlink Control Information (DCI) based Common Reference Signal (CRS) rate matching; and generating the plurality of rate matching configurations, each of the plurality of rate matching configurations being selectable based at least on a DCI field, the DCI field indicating at least one of a semi-static rate matching configuration and a CRS rate matching configuration; and transmitting to the WD the plurality of rate matching configurations.

11. The method of claim 9, wherein the indication of the determined rate matching configuration is one of DCI and a Medium Access Control (MAC) layer command.

12. The method of claim 9, wherein determining the rate matching configuration from the plurality of rate matching configurations for communication with the WD further includes:

measuring a load associated with at least one of the first RAT and the second RAT;

determining a resource for each one of the first RAT and the second RAT; and selecting the rate matching configuration, the rate matching configuration being the CRS rate matching configuration.

13. The method of claim 12, wherein the selecting the rate matching includes:

when physical resources are allocated for the first RAT:

muting a Long Term Evolution (LTE) and indicating in DCI that CRS rate matching may be omitted; and determining a number of subframes corresponding to the muted LTE CRS;

reconfiguring one rate matching configuration from the plurality of rate matching configurations based on the number of subframes; and transmitting the reconfigured one rate matching configuration to the WD and other WDs.

14. The method of claim 9, wherein determining the rate matching configuration from the plurality of rate matching configurations for communication with the WD is based at least in part on a neighbor interference.

15. The method of claim 9, wherein determining the rate matching configuration from the plurality of rate matching configurations for communication with the WD includes:

determining a radio channel condition associated with one of the first RAT and the second RAT;

measuring a load of neighboring cells associated with one of the first RAT and the second RAT;

identifying an interfered rate matching configuration based on the radio channel condition and the load of neighboring cells; and including at least one neighboring rate matching pattern in the plurality of rate matching configurations, the at least one neighboring rate matching pattern excluding at least one resource element associated with the interfered rate matching configuration.

16. The method of claim 9, wherein the method further includes:

evaluating and learning the rate matching configuration based at least on Key Performance Indicators (KPIs) a muted Common Reference Signal (CRS) on Long Term Evolution (LTE), and adjustments associated with wireless devices operating on New Radio (NR).

* * * * *